Sept. 2, 1958     F. O. EHRLER ET AL     2,850,220
TACKLE BOX
Filed Jan. 29, 1954     2 Sheets-Sheet 1
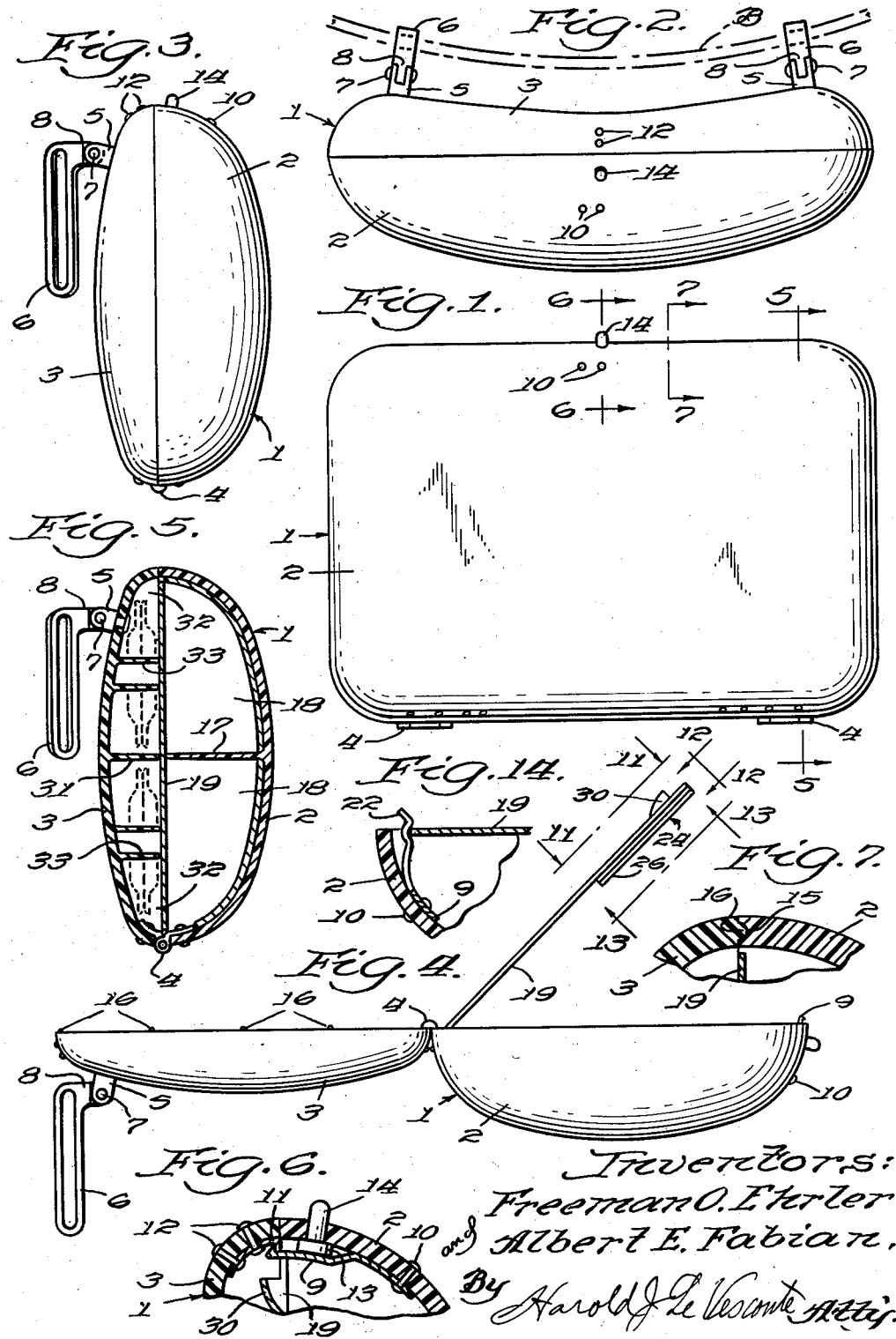

Sept. 2, 1958  F. O. EHRLER ET AL  2,850,220
TACKLE BOX
Filed Jan. 29, 1954  2 Sheets-Sheet 2
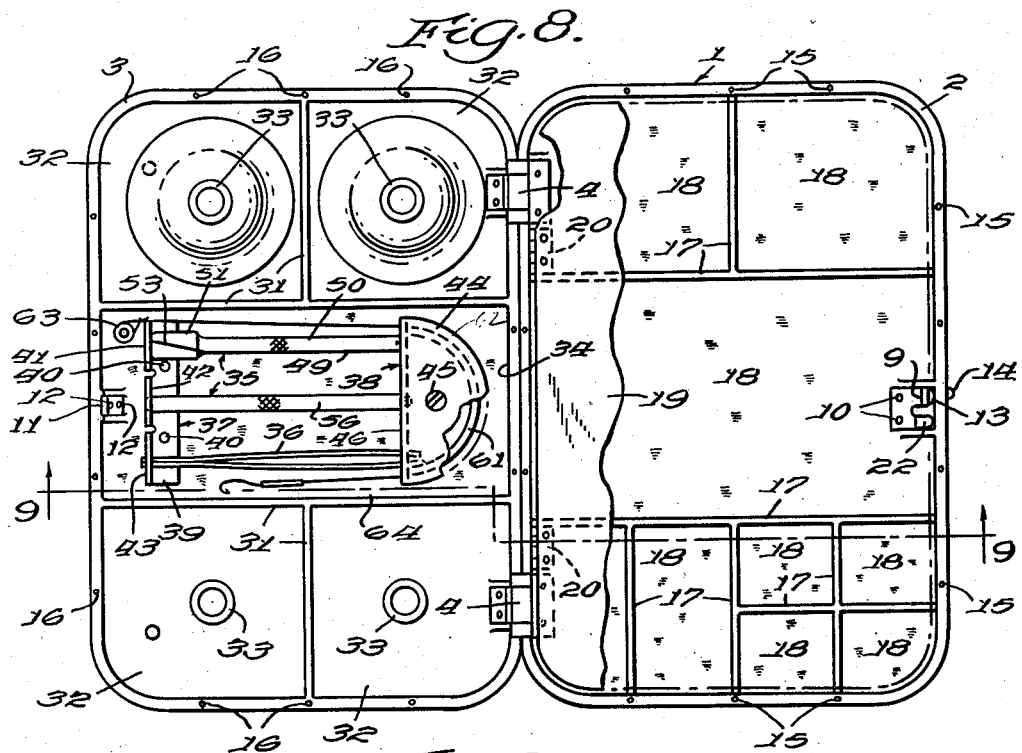
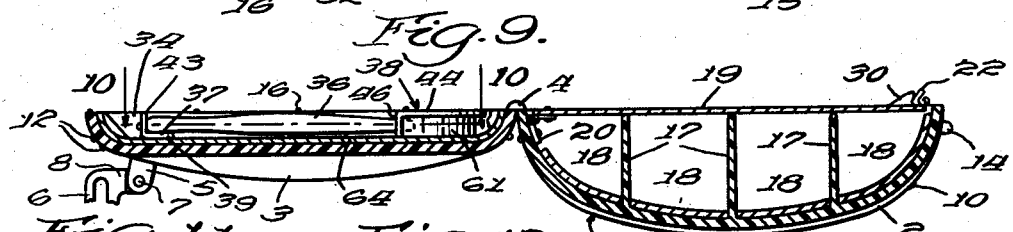
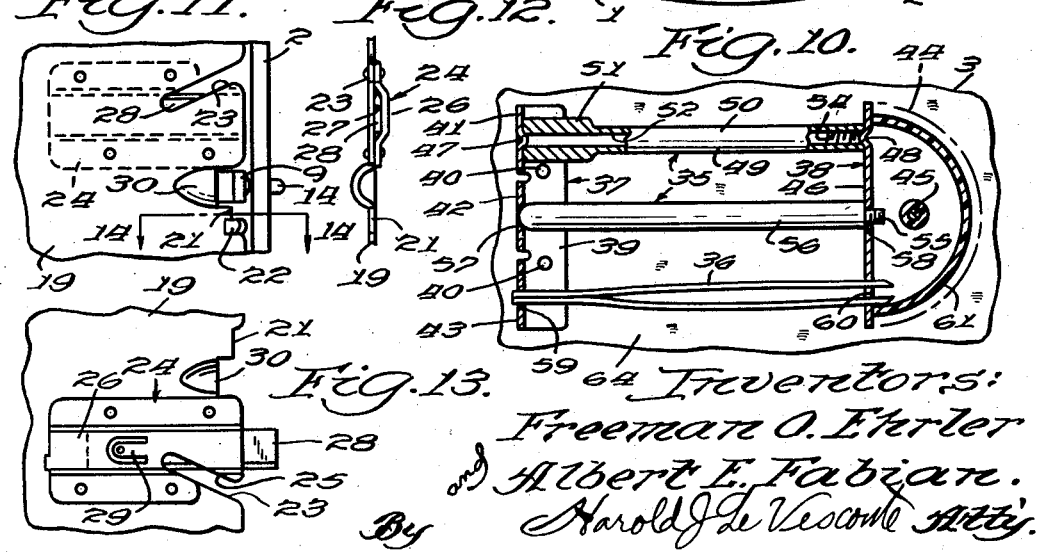
Inventors:
Freeman O. Ehrler
and Albert E. Fabian
By Harold J. DeVesconte Atty.

United States Patent Office 2,850,220
Patented Sept. 2, 1958

2,850,220

TACKLE BOX

Freeman O. Ehrler, North Hollywood, and Albert E. Fabian, Inglewood, Calif.

Application January 29, 1954, Serial No. 406,941

3 Claims. (Cl. 224—5)

This invention relates to fishing equipment and particularly to an improved form of tackle box for use by fishermen.

The principal object of the invention is to provide a tackle box which is designed to be carried by the waist encircling belt of the wearer.

Another object of the invention is to provide a tackle box of the above character which is so designed as to offer a minimum of obstruction to the movements of the user when not in use and which when opened for access maintains the tackle in convenient positions for access.

A further object of the invention is to provide a tackle box of the above character in which is provided convenient storage for leader spools together with convenient means for cutting off desired lengths of leaders.

Still another object of the invention is to provide a tackle box of the above character including means for holding disgorgers and other tools in positions of easy accessibility and which means also serves as means for maintaining the leader portions of snelled hooks extended to prevent the tangling thereof.

A still further object of the invention is to provide a tackle box in which all of the foregoing objects are realized in practice; which is simple in construction and economical to manufacture; which is designed for efficient and compact storage of the articles to be carried therein; and which is both reliable and convenient in use.

When the foregoing objects in view, together with such additional objects and advantages as may subsequently appear, the invention resides in the parts, and in the construction, combination and arrangement of parts, described by way of example, in the following specification of one mode of execution of the invention; reference being had to the accompanying drawings which form a part of said specification, and in which drawings:

Fig. 1 is a front elevation of a tackle box embodying the invention,

Fig. 2 is a top plan view of the tackle box shown in Fig. 1,

Fig. 3 is an elevational view of the left hand end of the tackle box shown in Fig. 1, Fig. 4 is a left hand elevation showing the tackle box in opened position, Fig. 5 is a transverse sectional view taken on the line 5—5 of Fig. 1, Figs. 6 and 7, are, respectively, enlarged, fragmentary, sectional views taken on the lines 6—6 and 7—7 of Fig. 1, Fig. 8 is a plan view of the tackle box opened for access; a portion of the internal divider member being broken away to disclose internal construction, Fig. 9 is a transverse sectional view taken on the staggered line 9—9 of Fig. 8, Fig. 10 is an enlarged sectional view of the tool holding and hook leader retaining means taken on the line 10—10 of Fig. 9, Figs. 11, 12 and 13, are, respectively, enlarged top, edge and bottom views of the leader cutting means; the viewed areas being designated by the arrowed lines 11—11, 12—12 and 13—13 in Fig. 4, and Fig. 14 is a fragmentary sectional view of the divider latching means; the view being taken on the line 14—14 of Fig. 11.

In the illustrated embodiment the tackle box is generally designated by 1 and comprises a front member 2 hingedly connected to a rear member 3 by a pair of hinges 4, 4 along the lower meeting edges of the members. As viewed in side elevation, the members 2 and 3 at their meeting edges are of rectangular configuration with rounded corners and as viewed in top plan the outer face of the member 3 is concavely curved to accommodate the waist of the wearer and the outer face of the outer member is correspondingly convexly curved. As viewed in end elevation, both members are convexly curved to produce a somewhat oval configuration. The walls of the members defined by the outer surfaces thereof are of substantially uniform thickness and define the tackle storage space within the box. Adjacent the top edge of the inner member 3 and adjacent the end edges thereof, the inner member carries a pair of outwardly projecting lugs 5, 5 to which receiving loop members 6, 6 for a belt B are connected by hinge pins 7, 7; the loop members being provided with laterally extending hinge pin receiving shanks 8, 8 which are sufficiently long to permit the tackle box to be swung to a horizontal position without engaging the belt of loop members as best shown in Fig. 4. The hinge pins are horizontally parallel to the adjacent surface of the box when it is in its normal vertical position and are thus disposed in outwardly converging vertical planes which are substantially normal to the radii of the curves of the belt of the user which passes through the loop members 6, 6. Movement of the box to horizontal position thus tends to swing the distal ends of the loops 6, 6 toward each other with consequent creation of a bias tending to return the box to its normal vertical position. Thus, since the hinges maintain this bias, there is no tendency for the box to swing on the hinges as would be the case if the hinges were axially aligned. The members 2 and 3 are held in closed condition by a releasable latch means disposed at the upper edges thereof and comprising a spring metal detent 9 secured to the inner face of the member 2 at about the midlength of the upper edge thereof by rivets 10, 10 and a cooperating catch element 11 secured to the inner face of the member 3 by rivets 12, 12. A push pin having a head portion 13 disposed between the adjacent faces of the member 2 and the detent 9 and having a shank portion 14 of smaller diameter extending through the wall of the member 2 provides a means for release of the catch means to open the box. Preferably, the members 2 and 3 are formed of plastic moldings which are economical to produce and which are both light in weight and attractive in appearance. Incidentally this method of production permits the simultaneous formation of the partitions and other interior elements to be later described in detail. The edge of the member 2 is provided with a series of shallow depressions 15 and the meeting edge of the member 3 is provided with a corresponding series of projections 16 which interengage with the depressions 15 and serve to hold the members 2 and 3 in alignment with closed (see Fig. 7).

The interior of the member 2 is divided by a series of partitions 17 to form compartments 18 of varying sizes to accommodate various articles of tackle and the like; the bottoms of the compartments being preferably lined with cork into which the points of hooks carried therein may be inserted to protect the hook points and to prevent tangling of the hooks with each other and with other articles carried in the compartments. The upper edges of the partitions are disposed slightly below the plane of the edges of the member 2 to provide clearance for a divider and cover element 19 hingedly connected to the inner face of the member 2 by hinges 20, 20 disposed inwardly of and adjacent to the hinges 4, 4. The free edge of the divider element 19 opposite the hinged edge thereof is provided with a notch 21 engageable with a spring detent 22 formed as an integral part of the latch detent 9 as best shown in Figs. 11 and 14; said detent 22 extending slightly above the plane of the divider element to provide means for manual release of the detent from latching engagement with the divider element. Also, the said free edge of the divider element 19 adjacent the notch 21 carries a leader cutting means; said means comprising an inclined slot 23 formed in the edge of the divider element 19, a plate 24 having a corresponding inclined slot 25 secured to one face of the divider element with the said inclined slots in registry; said plate having an offset portion 26 between the edges thereof which provides a slot 27 in which a razor blade 28 may be inserted with the cutting edge thereof overlying the aligned inclined slots 23 and 25 as best shown in Figs. 11 and 13. A spring tongue 29 formed in the offset portion 26 of the plate 24 provides frictional means for holding the blade against unintentional dislodgement. By inserting a length of leader material in the said inclined slots and pulling it toward the end thereof the leader will be forced against the edge of the blade and readily severed thereby. Adjacent the plate 24, the divider element 19 is provided with an offset portion 30 to provide clearance for operation of the latch detent element 9.

The inner portion of the member 3 is divided by partitions 31 to form a series of leader spool containing compartments 32 disposed one in each corner of the member 3 and each including a spool holding stud element 33, and a central compartment 34 having a lining of cork and containing tools most commonly employed by fishermen and comprising a two-part hook disgorger 35 and a pair of tweezers 36, together with a holding means therefor comprising members 37 and 38 and which has a second function presently to be described. The member 37 includes a base portion 39 attached by rivets 40 to the wall of the member 3 adjacent to that end of the compartment 34 which is adjacent the upper edge of the member 3 and resilient tongues 41, 42 and 43 extending parallel to said upper edge and disposed at right angles to the base portion 39. The member 38 includes a base portion 44 attached by a screw 45 threaded into a boss rising from the wall of the member 3 at the opposite end of the compartment 34 and a portion 46 spaced from and extending parallel to the tongue portions of the member 37. The tongue 41 and member 46 at the aligned ends thereof are each provided with opposed projections 47 and 48 which engage the opposite ends of the hook engaging portion 49 of the two part hook disgorger 35; said disgorger portion comprising a cylindrical metal bar having a shank 50 and an enlarged head portion 51. The head portion is provided with a central longitudinal bore 52 and the wall formed thereby is provided with a narrow, steeply helically inclined slit 53 for reception of a leader or line. The shank end of the disgorger portion 49 is provided with an axially disposed internally threaded hole 54 for engagement with the externally threaded end 55 of a handle portion 56 secured in aligned holes 57 and 58 in the tongue 42 and member 44. In use, the disgorger portions are removed from their snap-in engagement with their holding members and assembled. After use, they are taken apart and returned to their holding means. Additionally, the tongue 43 and member 46 are provided with aligned openings 59 and 60 for reception of the opposite ends of the pair of tweezers 36; the opening 60 in the member 46 being of such width as to hold the tweezer jaws slightly compressed to insure their being held in place.

The base portion 44 of the member 38 also is mounted on an upstanding, substantially semicircular wall 61 formed integrally with the member 3; said base member terminating in an outwardly projecting flange overhanging the convex face of said wall and the wall of the member 3 adjacent one end of the member 37 is provided with an upstanding stud element 63 preferably molded integrally with the member 3. The stud is adapted to enter the leader loops of snelled hooks and the leaders are thence trained around the wall 61 and the points of the hooks embedded in a cork lining 64 on the bottom of the compartment; as indicated in Fig. 8. By this means the leaders are kept extended in an orderly manner and the hook points are protected against being blunted.

Thus there has been created a tackle box which may be attached to the belt of the user where access may readily be had at all times. The box is of such shape that it does not interfere with the bodily movements of the user and the rounded exterior shape is of great help in going through brush and the like in that there is no liability that the box will be caught or otherwise impede progress. Moreover, since it is attached to the user, it leaves both hands free at all times when the box is not opened for access, and still further, when opened, all of the tackle is spread out for ready access.

The invention is not to be deemed to be limited to the exact form thereof above disclosed by way of example and since changes and modifications may suggest themselves in the light of such disclosure, the invention is to be understood to include all such modifications and changes in the parts and in the construction, combination and arrangement of parts as shall come within the purview of the appended claims.

We claim:

1. A tackle box comprising a pair of concavo-convex members of substantially rectangular configuration in side outline disposed with the concave sides thereof in juxtaposition to define a tackle containing cavity, hinge means interconnecting said members along one edge thereof, a manually releasable latching means including complementary portions carried by each of said members disposed at the edges thereof opposite said hinge means, and means for attaching said tackle box to a waist encircling belt of a person; said attaching means comprising a pair of belt engaging loop members hingedly mounted on the exterior of one of said members in spaced relation in a plane normal to the plane of juncture of said members and adjacent to the edges of said members carrying said latch means, the axes of said mountings for said loop members being disposed normal to the radii of the curves of a belt worn by a person and which extends through said loop members with resultant conformation of said loop members to the directions of the belt passing therethrough and maintenance of a bias on said box to remain in a vertical position hanging from the belt and to yieldingly resist free swinging movement about the said hinged mountings for said loop members.

2. A tackle box comprising a pair of concavo-convex members of substantially rectangular configuration in side outline disposed with the concave sides thereof in juxtaposition to define a tackle containing cavity, hinge means interconnecting said members along one edge thereof, a manually releasable latching means including complementary portions carried by each of said members disposed at the edges thereof opposite said hinge means, a divider element hingedly connected to one of said members adjacent the hinge interconnection between said members and serving as a cover for tackle contained in said one member, a releasable, spring latch means for securing said divider element in closed relation with respect to said one member, and means for attaching said tackle box to a waist encircling belt of a person; said attaching means comprising a pair of belt engaging loop members hingedly mounted on the exterior of one of said members in spaced relation in a plane normal to the plane of juncture of said members and adjacent to the edges of said members carrying said latch means, the axes of said mountings for said loop members being disposed normal to the radii of the curves of a belt worn by a person and which extends through said loop members with resultant conformation of said loop members to the directions of the belt passing therethrough and maintenance of a bias on said box to remain in a vertical position hanging from the belt and to yieldingly resist free swinging movement about the said hinged mountings for said loop members.

3. A tackle box comprising a pair of concavo-convex members of substantially rectangular configuration in side outline disposed with the concave sides thereof in juxtaposition to define a tackle containing cavity, a series of integrally formed partitions on the inner faces of each of said members dividing said cavity into a plurality of tackle containing compartments, hinge means interconnecting said members along one edge thereof, a manually releasable latching means including complementary portions carried by each of said members disposed at the edges thereof opposite said hinge means, and means for attaching said tackle box to a waist encircling belt of a person; said attaching means comprising a pair of belt engaging loop members hingedly mounted on the exterior of one of said members in spaced relation in a plane normal to the plane of juncture of said members and adjacent to the edges of said members carrying said latch means, the axes of said mountings for said loop members being disposed normal to the radii of the curves of a belt worn by a person and which extends through said loop members with resultant conformation of said loop members to the directions of the belt passing therethrough and maintenance of a bias on said box to remain in a vertical position hanging from the belt and to yieldingly resist free swinging movement about the said hinged mountings for said loop members.

References Cited in the file of this patent

UNITED STATES PATENTS

| | | |
|---|---|---|
| 417,979 | Borchert | Dec. 24, 1889 |
| 1,076,542 | Balch | Oct. 21, 1913 |
| 1,150,776 | Lamb | Aug. 17, 1915 |
| 1,388,187 | Marble | Aug. 23, 1921 |
| 1,580,474 | Ebenbrecht | Apr. 13, 1926 |
| 1,684,417 | Silverman | Sept. 18, 1928 |
| 1,815,101 | Goldstein | July 21, 1931 |
| 2,098,636 | Smith et al. | Nov. 9, 1937 |
| 2,148,860 | Huber | Feb. 28, 1939 |
| 2,558,124 | Burden | June 26, 1951 |
| 2,630,651 | McGee | Mar. 10, 1953 |

FOREIGN PATENTS

| | | |
|---|---|---|
| 185,561 | Great Britain | Sept. 14, 1922 |
| 325,323 | Great Britain | Feb. 20, 1930 |
| 1,032,648 | France | July 3, 1953 |